United States Patent [19]

Zangenfeind et al.

[11] Patent Number: 4,888,613

[45] Date of Patent: Dec. 19, 1989

[54] METHOD OF AND APPARATUS FOR PROCESSING EXPOSED PHOTOGRAPHIC FILMS

[75] Inventors: Helmut Zangenfeind, Puchheim; Reinhart Würfel, Munich, both of Fed. Rep. of Germany

[73] Assignee: AGFA-Gevaert Aktiengesellschaft, Leverkusen, Fed. Rep. of Germany

[21] Appl. No.: 264,398

[22] Filed: Oct. 28, 1988

[30] Foreign Application Priority Data

Nov. 6, 1987 [DE] Fed. Rep. of Germany ....... 3737796

[51] Int. Cl.$^{4}$ ............................................ G03B 27/52

[52] U.S. Cl. ........................................ 355/41; 355/68; 355/77

[58] Field of Search ........................ 355/36, 68, 77, 41; 354/308

[56] References Cited

U.S. PATENT DOCUMENTS

| | | | |
|---|---|---|---|
| 4,565,442 | 1/1986 | Benker et al. | 355/68 |
| 4,621,970 | 11/1986 | Würfel et al. | 414/412 |
| 4,643,371 | 2/1987 | Würfel et al. | 242/55 |
| 4,704,026 | 11/1987 | Rauh et al. | 355/38 |
| 4,732,278 | 3/1988 | Zangenfeind et al. | 209/546 |
| 4,799,076 | 1/1989 | Zangenfeind et al. | 354/308 |

*Primary Examiner*—L. T. Nix

*Assistant Examiner*—D. Rutledge

*Attorney, Agent, or Firm*—Peter K. Kontler

[57] ABSTRACT

Cartridges which contain exposed photographic roll films are admitted into a duct to descend past a reader which reads the bar codes of the cartridges and transmits to a microprocessor signals denoting the type and the length of each film. The microprocessor evaluates such signals and permits automatic splicing of films of a selected type end-to-end preparatory to introduction into a developing machine. Cartridges with films of other types are segregated from cartridges with films of the selected type, the same as cartridges which do not bear any bar codes. The microprocessor compares the encoded information pertaining to the length of each film with information denoting the actual length of the respective film and causes a printer to encode the information on envelopes for the exposed and developed films. The reels for films which are shorter than denoted by the respective bar codes are removed by an attendant and are inspected for the possible presence of one or more exposed frames. A film which has been detached from the core of the respective reel is permitted to advance with other selected films if the microprocessor indicates that the length of such film matches that which is denoted by the respective bar code.

26 Claims, 3 Drawing Sheets

METHOD OF AND APPARATUS FOR PROCESSING EXPOSED PHOTOGRAPHIC FILMS

BACKGROUND OF THE INVENTION

The invention relates to improvements in methods of and in apparatus for processing exposed photographic films which carry or are confined in and/or otherwise associated with containers bearing machine-readable information denoting at least one characteristic (such as the length and/or the type) of film.

Commonly owned U.S. Pat. No. 4,732,278 (granted Mar. 22, 1988 to Zangenfeind et al. for "Apparatus for transporting cartridges for exposed roll film") discloses an apparatus wherein cartridges containing exposed but still undeveloped roll films are admitted into a downwardly sloping duct for delivery to reel removing and film unwinding stations. Thus, the films (which are convoluted on the cores of reels) are first withdrawn from the respective cartridges together with the reels, and the films are thereupon unwound from the reels so that they can be spliced end-to-end preparatory to introduction of the thus obtained composite film into a developing or other processing machine. The duct of the apparatus which is disclosed by Zangenfeind et al. supports a monitoring or reading device which can read the information (normally a bar code) at the exterior of the shell of each cartridge which is admitted into the duct. The monitoring device generates signals which are used to initiate the retraction of a gate which permits the respective cartridge to descend in the duct if the film in such cartridge is compatible with the previously inserted films, namely when the film can be developed and further processed with films which were withdrawn from the previously monitored cartridges. The bar code on the cartridges can denote whether or not the film in the monitored cartridge is daylight or artificial light film, color film, black-and-white film, etc. If the film in the monitored cartridge is not compatible with the previously treated films, the monitoring device generates a visible, audible or otherwise detectable signal which informs the operator that the cartridge must be withdrawn from the duct. Thus, the monitoring device permits further descent of those cartridges which contain films that can be processed in the developing machine wherein various baths are satisfactory for the development of a selected type of film, e.g., regular color film.

A drawback of conventional apparatus for the processing of exposed but undeveloped customer films which are supplied in cartridges is that they are likely to properly categorize certain problem films, for example, when a film has developed a break at a location such that the length of film which has been unwound from a reel subsequent to removal of the reel from its cartridge accidentally matches a standard length (e.g., twelve, twenty or twentyfour frames). Moreover, manipulation of problem films (e.g., those on reels for torn films) is a time-consuming operation. As a rule, an operator must reach with both hands into a dark room to manually unwind the remnant of a torn film from the reel or to remove the respective reel from the dark room in a specially designed container for transfer into a hanger- or suspension-type developing machine. Reference may be had to commonly owned copending patent application Ser. No. 040,868 filed Apr. 21, 1987 (now Pat. No. 4,799,076) by Zangenfeind et al. for "Apparatus for affording access to exposed but undeveloped films in a dark chamber".

OBJECTS AND SUMMARY OF THE INVENTION

An object of the invention is to provide a novel and improved method of evaluating the information which is obtained as a result of monitoring the containers for exposed but undeveloped films and of utilizing the thus obtained information for proper classification of films according to their characteristics, particularly type and length.

Another object of the invention is to provide a method which renders it possible to properly calculate and record the cost of the operation in dependency upon the length of customer films.

A further object of the invention is to provide a method which can be relied upon to segregate from acceptable films all those films which are known as problem films and include films with unsatisfactory perforations, shorter-than-expected films, films with breaks or tears between their ends and/or others.

An additional object of the invention is to provide a method which renders it possible to simultaneously classify two or more types of films as a result of a single monitoring operation.

Still another object of the invention is to provide a novel and improved apparatus for the practice of the above outlined method.

A further object of the invention is to provide the apparatus with novel and improved means for evaluating and utilizing information which is recorded on cartridges for exposed but undeveloped customer films.

Another object of the invention is to provide the apparatus with novel and improved means for reliably discriminating between acceptable and problem films.

An additional object of the invention is to provide the apparatus with novel and improved means for facilitating the task of attendants in connection with the evaluation of problem films.

A further object of the invention is to provide the apparatus with novel and improved means for mass-processing exposed but undeveloped customer films which are supplied to a laboratory in cartridges.

One feature of the present invention resides in the provision of a method of processing a series of successive exposed photographic films with machine-readable information denoting at least the type of film (such as black-and-white film, color film or color reversal film). The method comprises reading the information for successive films of the series and generating first signals denoting the thus obtained information, a first step of comparing successive first signals with a second signal denoting films of a first type (e.g., color films), a second step of comparing at least one third signal denoting films of at least one second type (e.g., black-and-white films and/or color reversal films) with first signals which are incompatible with the second signal (i.e., with first signals denoting films which are not regular color films if the second signal is indicative of color films), advancing along a predetermined path those films which are denoted by first signals compatible with the second signal (this renders it possible to splice such films end-to-end and convolute them onto a takeup reel to form a large roll ready for introduction into a machine which is set up for the development of color films), segregating the films which are denoted by first signals compatible with the third signal (i.e., segregating color reversal and black-and-white films if the films to be processed are regular color films), and individually inspecting and classifying those films which are denoted by first signals incompatible with the second and third signals (e.g., those films which are not denoted by any machine-readable information so that no first signals of any kind are generated in the course of the reading step).

If the exposed photographic films of the aforementioned series are in random distribution with additional exposed photographic films without machine-readable information, the method preferably further comprises subjecting the additional films to inspection by an attendant, and admitting into the aforementioned path those attendant-inspected additional films which can be categorized with the films that advance along the path, e.g., with color films which are ready to be prepared for introduction into a developing machine.

As a rule (or at least in many instances), the machine-readable information (such as a bar code) denotes the type and the length of films. The reading step then preferably includes generating first signals which denote the ascertained information pertaining to the types as well as to the lengths of successive films, and the method further comprises the step of recording (such as printing) information denoting the length of films which are advanced along the predetermined path on envelopes for future storage of the respective films therein. Such envelopes ultimately contain sections of roll films plus one or more sets of prints and bear additional information including the name of the customer, the cost of the transaction and/or others.

In addition to or in lieu of the just enumerated steps which are carried out if the information pertaining to the films includes data regarding the type and the length of the respective films, the inspecting step can include individually inspecting and classifying films having a length which deviates from the length denoted by the encoded information (e.g., all films with ten, twelve or twentyfour frames if the length denoted by the encoded information is that of a film with thirtysix frames).

The films which are processed in accordance with the improved method are normally convoluted on reels which are confined in cartridges or analogous containers (hereinafter called cartridges), and the machine-readable information is normally applied to the exterior of the cartridges. Therefore, such method normally further comprises the step of removing the reels with films from the respective cartridges prior to the first comparing step and subsequent to the reading step.

The method can further comprise the step of splicing successive films in the predetermined path end-to-end so that they jointly form a long or very long composite film which is wound onto a core to form a large roll ready to be transferred into a developing machine for films having a predetermined length and/or for films of a predetermined type (as denoted by the second signal).

The comparing steps can be carried out in a microprocessor having one or more memories, e.g., a first memory for the second signal or signals and a second memory for the third signal or signals.

The method can also comprise the step of displaying those first signals which are incompatible with at least one of the second and third signals, for example, jointly with the second and/or third signal.

Another feature of the invention resides in the provision of an apparatus for processing a series of exposed photographic films with machine-readable information denoting at least the type of film. The apparatus comprises means for reading information for successive films of the series and for generating first signals denoting the thus ascertained information, and signal evaluating means (e.g., a microprocessor) including a source of second signals denoting films of a first type and of at least one third signal denoting films of at least one second type, first comparing means for comparing successive first signals with the second signals for compatibility, and second comparing means for comparing the third signal with first signals which are incompatible with the second signals. The apparatus further comprises means for advancing films along a predetermined path, and the evaluating means further comprises means (such as a key or a trigger) for effecting the admission into the predetermined path of successive films which are denoted by first signals compatible with the second signals. The apparatus also comprises facilities for individual inspection and classification of films which are denoted by first signals that are incompatible with the second and third signals. For example, the series of exposed photographic films can include black-and-white films, color films and color reversal films. The color films are to be introduced into the predetermined path because they are of the type which is denoted by the second signals. Black-and-white films and color reversal films are segregated from regular color films so that they can be processed independently of the regular color films. If the series contains one or more films which are not properly identified (e.g., because they or their cartridges lack proper identification or any identification as to type), such films are handled individually and the person or persons in charge may decide to admit them into the predetermined path if such person or persons ascertain that these films can be processed with regular color films, e.g., in a developing machine which is set up for the development of color films.

As a rule, the films are convoluted on reels which, in turn, are normally confined in cartridges or other types of containers (hereinafter called cartridges). The machine-readable information is normally applied to the exterior of the cartridges, particularly in a bar code. The apparatus for processing films which are convoluted on reels and are confined in cartridges further comprises means for removing reels with the respective films from their cartridges subsequent to reading of the information by the reading means and prior to admission of films into the predetermined path. The apparatus can also include means for monitoring the trailing ends of films in the predetermined path and for transmitting to the evaluating means additional signals in response to detection of the trailing ends. Films which are treated in the improved apparatus are normally provided with perforations, particularly with marginal perforations. The apparatus can further comprise means for monitoring the condition of perforations of films in the path and for transmitting to the evaluating means signals which denote the condition of monitored perforations.

The apparatus can comprise a preferably downwardly sloping duct having an upper end portion provided with an inlet for cartridges which contain successive reels for films of the aforementioned series of films and serving to deliver cartridges to the reel removing means in a predetermined orientation, and means for unwinding successive films from the respective reels prior to admission of films into the predetermined path. The reading means preferably comprises a reader of bar codes or other machine-readable information, and such reader can be placed adjacent the duct so as to ensure that properly applied machine-readable information is in an optimum position for the reader since the duct comprises means for advancing the cartridges in a predetermined orientation, not later than when the cartridges reach the reader.

In many instances, the information which is applied to the cartridges denotes the types of films and the length of the films on the respective reels. The reader of the reading means then includes means for transmitting to the evaluating means first signals which are indicative of the types and lengths of the respective films. Such apparatus then further comprises means for monitoring or measuring the length of unwound films and for transmitting to the evaluating means fourth signals which are indicative of the measured length. The evaluating means of such apparatus further comprises means for comparing the fourth signals with the corresponding first signals and for generating fifth signals when the film length which is denoted by a fourth signal deviates from the film length which is denoted by the corresponding first signals.

The apparatus can comprise severing means which is operable to separate the trailing ends of films from the respective reels, and means for preventing operation of the severing means in response to the generation of fifth signals. Furthermore, the evaluating means can comprise means for initiating the comparison of fourth signals with the respective first signals in response to reception of additional signals from the means for monitoring the predetermined path for the presence of trailing ends of successive films in such path. The evaluating means can cause the severing means to separate films from the corresponding reels in response to additional signals which denote the condition of perforations on the respective films.

The unwinding means can include means for expelling or ejecting empty reels in response to additional signals denoting satisfactory condition of perforations on the respective films.

The evaluating means can be operatively connected with means for displaying the first, second, third, fourth and/or fifth signals and, if necessary, the additional signals denoting the detection of trailing ends of films in the predetermined path and/or the condition of perforations. The evaluating means can be caused to prevent the operation of the expelling or ejecting means in response to the generation of fifth signals. Furthermore, the evaluating means can deactivate the unwinding, removing and/or advancing means in response to the generation of fifth signals. Still further, the fifth signals can be used to initiate stoppage of the leaders of corresponding films in a predetermined portion of the path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
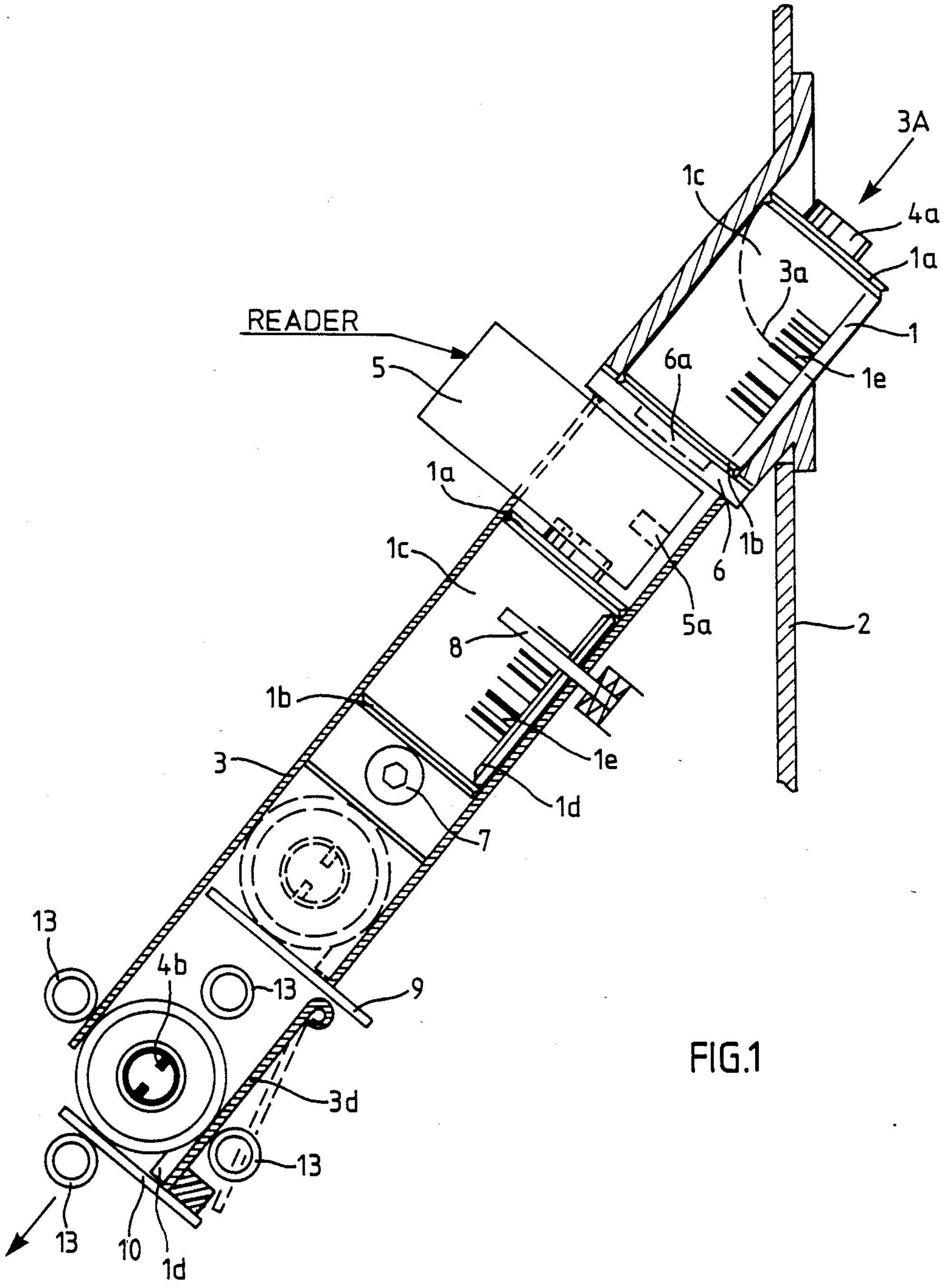
FIG. 1 is a sectional view of a first portion of the improved apparatus including a duct wherein successive cartridges are properly oriented prior to advancing past a reader for the DX-code and into the range of means for removing reels and convoluted films thereon from the respective cartridges.

Referring first to FIG. 1, there is shown a portion of an apparatus which embodies the invention and wherein successive cartridges 1 for reels 4 (FIG. 2) are monitored prior to withdrawal of the reels 4 therefrom. The apparatus includes a downwardly sloping duct 3 which is secured to an upright wall 2 and has an inlet 3*a* for admission of successive cartridges 1 in a predetermined orientation so that the protruding portion of the core 4*a* of the respective reel 4 is located at the trailing (upper) end of the properly inserted cartridge. At least a portion of each core 4*a* is hollow and is provided with internal ribs or webs 4*b* which facilitate predictable rotation of the core, e.g., to advance the film in a camera or to unwind the film from its reel 4. To this end, the hollow portion of the core 4*a* can receive a suitable blade-like or otherwise configurated torque-transmitting element having recesses for the ribs or webs 4*b* and being rotatable by a film transporting or unwinding mechanism.

Each cartridge 1 comprises a substantially cylindrical shell 1*c* with two open ends which are normally sealed by end walls 1*a* and 1*b*. The shell 1*c* has a tangential mouth 1*d* which extends all the way between the end walls 1*a*, 1*b* and contains suitable sealing means in the form of strips of felt or a similar material. The end walls 1*a*, 1*b* can be forcibly extracted from the respective ends of the shell 1*c* and are provided with centrally located openings for the core 4*a* of the respective reel 4. As can be seen in FIG. 1, each shell 1*c* is provided with externally applied machine-readable information 1*e* in the form of a bar code which is immediately or closely adjacent the mouth 1*d* and denotes the type of film 35 as well as the length of the film, namely the number of frames which can be exposed when the cartridge 1 is properly inserted into a camera.

A cartridge 1 which has been introduced into the inlet 3*a* of the duct 3 comes to rest on a gate 6 in such orientation that the gate is adjacent one of the end walls 1*a*, 1*b*. At such time, a portion of the cartridge 1 projects upwardly beyond the inlet 3*a* which is suitably shaped to permit reliable engagement of an improperly inserted cartridge by several fingers of one hand preparatory to extraction of the improperly inserted cartridge from the duct 3. To this end, the inlet 3*a* has notches for at least two fingers. A properly inserted cartridge 1 abuts the gate 6 with its end wall 1*b* while the end wall 1*a* and the protruding portion of the core 4*a* project from the inlet 3*a* of the duct 3. If a cartridge 1 is inserted in inverted position, the protruding portion of the core 4*a* enters a complementary recess 6*a* in the adjacent side of the gate 6 and prevents extraction of the gate from the duct 3 so that the improperly inserted cartridge 1 cannot descend beyond the gate 6 and into the range of a reading or monitoring device (reader) 5. The configuration of the surface surrounding the inlet 3a of the duct 3 is such that the cartridge 1 can be inserted in a single angular position, namely in an angular position such that the mouth 1d is located in the lower left-hand quadrant of the duct 3 (as seen in the direction of arrow 3A) and the information (bar code) 1e is in an optimum position for reading by the monitoring device 5 subsequent to retraction of the gate 6 and advancement of the cartridge 1 into the range of the device 5. The gate 6 is normally located in a plane such that approximately one-half of the mouth 1d of a properly inserted cartridge 1 remains exposed when the end wall 1b of such cartridge comes to rest on the gate 6. The means for extracting the gate 6 from the duct 3 in response to insertion of a cartridge 1 into the inlet 3a is not shown in FIG. 1. Reference may be had to the aforementioned U.S. Pat. No. 4,732,278 to Zangenfeind et al. This also applies for certain other parts of the apparatus which is shown in FIG. 1. As explained in the patent to Zangenfeind et al., the extracting means is preferably designed to generate a signal when the recess 6a of the gate 6 receives the protruding portion of the core 4a in an improperly inserted cartridge 1 so that the operator in charge can extract the improperly inserted cartridge and change its orientation prior to reintroduction into the inlet 3a of the duct 3. The diameter of the recess 6a is or can be somewhat larger than the diameter of the protruding portion of the core 4a.

The device 5 can constitute a relatively simple point or dot reader because each cartridge 1 which is permitted to advance into the range of the reader is located at an optimum distance therefrom and in an optimum angular position relative thereto. For example, and as can be best seen in FIG. 3, the reader 5 can comprise a radiation source 5c which directs a beam of coherent light at a selected angle through a slit 5a (FIG. 1) in the duct 3 and against the external surface of the shell 1c. The reflected radiation impinges upon a photoelectronic transducer 5b which transmits signals to a decoder 25a.

Figure 2:
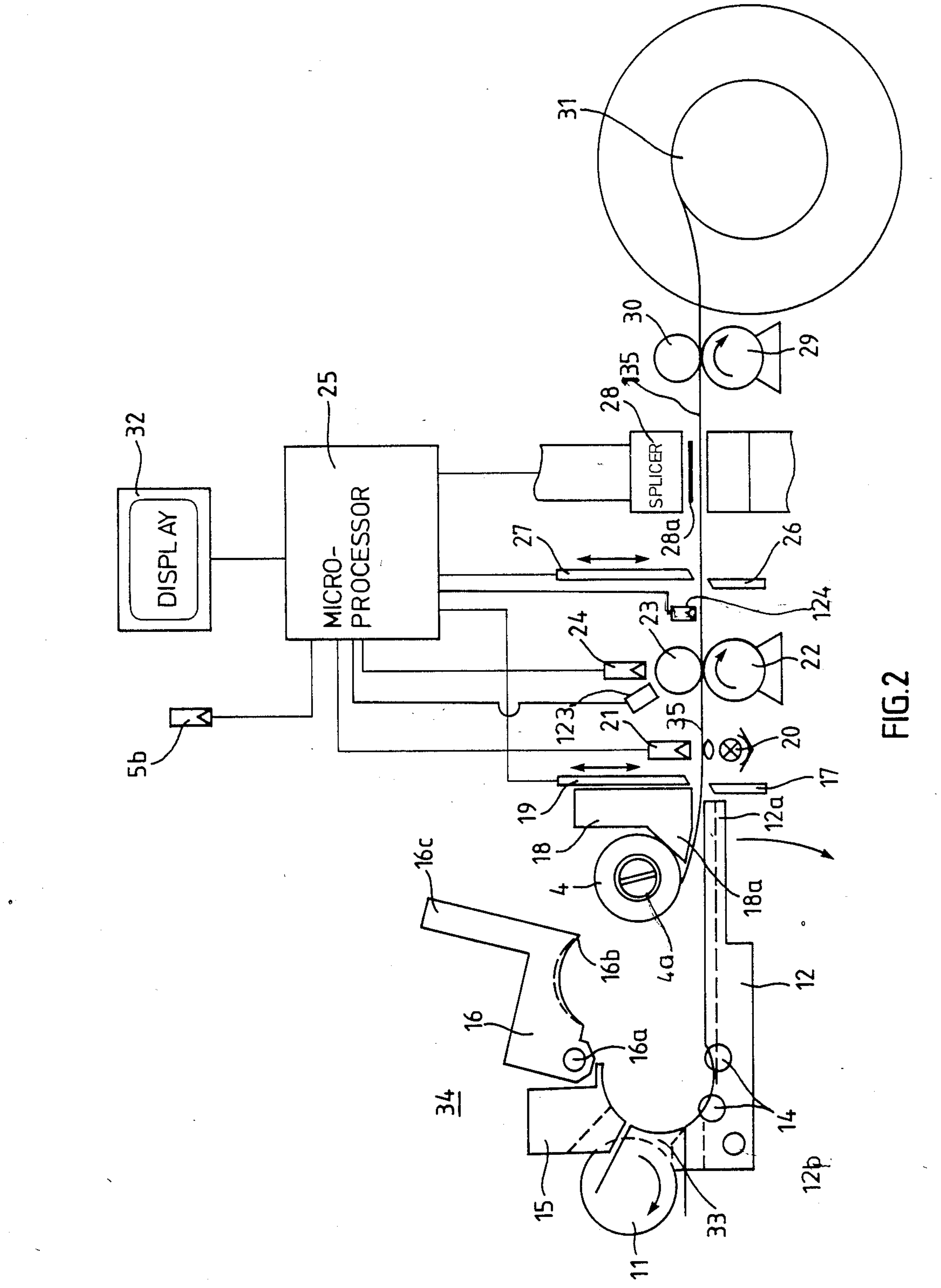
FIG. 2 shows a second portion of the apparatus including the film unwinding means and the means for splicing selected films end-to-end preparatory to introduction of the resulting composite film into a developing machine.

The duct 3 further contains an eccentrically located orientation changing device 7 which is located at a selected distance (e.g., one and a half lengths of a cartridge 1) from the gate 6. The device 7 can include a cylindrical pin or stud having a length which matches or approximates one-fifth of the diameter of a shell 1c. As shown in FIG. 2 of the patent to Zangenfeind, the duct 3 includes an enlarged portion in the region of the orientation changing device 7 so that successive cartridges 1 can be tilted to positions in which the axes of their shells 1c are horizontal or substantially horizontal to conform to the outline of the adjacent portion of the duct 3 wherein the thus reoriented cartridges descend into the range of a means for removing or withdrawing the reels 4 from the respective shells 1c. A cartridge 1 which has descended onto the orientation changing device 7 is free to change its orientation in response to extraction or retraction of a spring-biased barrier 8 which is fully described in the patent to Zangenfeind.

A cartridge 1 which has descended to a level below the orientation changing device 7 assumes a position of rest in which the mouth 1d is located beneath the major portion of the shell 1c and abuts a second retractible gate 9. The latter is located at a level above a third gate 10 and a pivotable wall or flap 3d of the duct 3. The distance between the gates 9 and 10 equals or approximates the length of a cartridge 1 (as seen in the direction of arrow 3A). When the gate 9 is retracted (note the moving means 109 in FIG. 1 of the patent to Zangenfeind et al.), the cartridge descends onto the gate 10 and is then ready for withdrawal or removal of the reel 4 and film 35 (FIG. 2) from the respective shell 1c. The cartridge 1 on the gate 10 is surrounded by four substantially equidistant grippers 13 in the form of idler rollers with sharp circumferentially extending edges which engage the shell 1c at one axial end and hold it against movement while a plunger (note FIG. 2 of the patent to Zangenfeind et al.) expels the reel 4 and the film 35 in the axial direction of the shell. The plunger further serves to rotate the reel 4 during axial transport into an unwinding unit 34 which is shown in FIG. 2.

The unwinding unit 34 is similar to that which is disclosed in commonly owned U.S. Pat. No. 4,643,371 granted Feb. 17, 1987 to Würfel et al. for "Apparatus for unwinding exposed roll films from reels". The disclosure of this patent is incorporated herein by reference. The unit 34 comprises a housing for discrete reels 4, and the housing includes a mobile lower section 12, an arcuate shroud 33, an upper housing section 15 and a further mobile housing section 16. When the housing is closed (i.e., when the sections 12 and 16 assume the positions corresponding to those shown in FIGS. 3 and 4 of the patent to Würfel et al.), the reel 4 which has been withdrawn from its shell 1c by the mechanism including the grippers 13 of FIG. 1 and the aforementioned reciprocable plunger is located in a chamber or pocket above two idler rollers 14 on the mobile section 12. The latter is pivotable at 12b and the section 16 is pivotable at 16a. When the housing is closed, a wedge-like projection 16b of the mobile section 16 is adjacent the outermost convolution of film 35 on the core 4a of the reel 4 in the aforementioned pocket or chamber and serves to steer the leader of the film into an elongated substantially horizontal path including the nip of two film advancing or entraining rolls or wheels 22, 23. The outermost convolution of the film 35 on the core 4a of the reel 4 in the pocket or chamber between the sections 12, 15, 16 and shroud 33 of the housing is further engaged by a driven friction wheel 11 which rotates the reel 4 and the convoluted film 35 thereon in a counterclockwise direction (as seen in FIG. 2) in order to unwind the film from the core 4a and to cause the leader of the film to advance along the aforementioned path. The mobile sections 12 and 16 respectively comprise elongated extensions 12a, 16c which define an elongated channel for the film 35 which is being paid out by the reel 4 in the unwinding unit 34. If necessary, the leader of the film 35 is peeled off the outermost convolution on the core 4a of the reel 4 by the projection 16b while the convoluted film is rotated by the friction wheel 11 so that the leader enters the channel between the extensions 12a and 16c.

The unwinding unit 34 further comprises a bearing 18 which is adjacent the free end of the extension 16c when the section 16 assumes its closed or lower end position. The section 16 is pivoted to the open or raised position of FIG. 2 not earlier than when the leader of the film 35 has already entered the nip of the advancing rolls 22, 23 so as to ensure that the rolls 22, 23 can pull the film in a direction to the right and toward the nip of a transporting unit including two additional advancing rolls 29, 30. The reel 4 and the remaining portion of the film 35 are thereupon pulled by the advancing film 35 so that the flanges of the reel 4 abut the bearing 18 and more particularly an upwardly and forwardly sloping ramp 18a of the bearing. An advantage of the bearing 18 and its ramp 18*a* is that they reduce the likelihood of scratching of the film 35 during unwinding because the wedge-like projection 16*b* (which serves to introduce the leader of the film into the channel between the extensions 12*a*, 16*c* if such introduction is necessary) is then out of the way (i.e., it is remote from the film 35) and only the peripheral surfaces of flanges of the reel 4 engage the bearing 18 while the advancing film 35 is maintained out of contact with the bearing and its ramp 18*a*. The ramp 18*a* preferably includes two spread-apart panels or cheeks each of which engages one flange of the reel 4 and which establish between them a path for the advancing film 35 which is drawn toward the transporting unit 29, 30 by the advancing rolls 22, 23. The roll 22 is driven clockwise (as seen in FIG. 2) and the roll 23 is an idler roll which is biased toward the roll 22 by one or more springs, by a dashpot or in any other suitable way.

Another advantage of the bearing 18 is that it arrests the reel 4 in close or immediate proximity to a film severing device including a fixed knife 17 and a mobile knife 19. The knife 19 is disposed immediately behind the bearing 18 and is movable up and down by a suitable prime mover such as the motor 119 which is shown in FIG. 4 of the patent to Würfel et al. A presently preferred prime mover for the mobile knife 19 is an electromagnet. An advantage of the feature that the severing device including the knives 17, 19 is placed close to the locus where the reel 4 is held by the ramp 18*a* during unwinding of the film 35 is that the film can be severed close to the core 4*a* to thus ensure that each and every film frame has advanced beyond the severing station before the knife 19 is caused to perform a downward stroke in order to separate the exposed film frames from the reel 4 which abuts the ramp 18*a*. The unit 34 includes means for automatically expelling empty reels 4 in response to signals from the microprocessor 25.

The severing station with knives 17, 19 is followed by a scanning device which monitors the quality of perforations on the film 35 while the film advances in the channel between the extensions 12*a*, 16*c* and on toward the transporting unit including the advancing rolls 29, 30. This scanning or monitoring device includes a radiation source 20 which directs against the path of perforations in the film 35 a beam of visible light or other radiation so that the radiation which penetrates through the perforations impinges upon a transducer 21 whose output is connected with the corresponding input of an evaluating unit 25, e.g., a suitable microprocessor. The source 20 preferably emits non-actinic radiation which cannot penetrate through the film 35 so that the webs between successive perforations in a marginal portion of the advancing film 35 cause the transducer 21 to generate a series of signals at a frequency which is determined by the number of perforations per unit length of the film and by the selected speed of longitudinal movement of the film. The microprocessor 25 comprises means for comparing the duration and frequency of signals from the transducer 21 with reference signals denoting the optimum duration and optimum frequency so that the microprocessor can ascertain the condition of perforations in the film 35 which advances from the channel between the extensions 12*a*, 16*c* toward the nip of the rolls 22, 23. If the duration of one or more signals from the transducer 21 is excessive, the microprocessor 25 initiates segregation of the respective film 35 from other films due to a tear in the webs between neighboring perforations, the absence of perforations and/or the absence of webs between perforations.

The idler roll 23 cooperates with a photocell 34 which monitors the speed of the roll 23 and generates signals or pulses at a frequency which is indicative of the speed of film 35 in the nip of the rolls 22 and 23. Such signals or pulses are transmitted to another input of the microprocessor 25. FIG. 2 merely shows the transducer of the pulse-generating photocell 24 which can be of any conventional design and can constitute a standard timing pulse generator with a radiation source directing a beam of suitable radiation against the path of one or more holes provided in the roll 23 or in a disc which rotates with the roll 22 or 23 so as to ensure that the transducer of the photocell 24 can transmit signals or pulses at a frequency denoting the peripheral speed of the rolls 22, 23 and hence the speed of the film 35 which advances toward the nip of rolls 29, 30.

An output of the microprocessor 25 transmits signals to the drive means for the mobile knife 19, and another output of the microprocessor transmits signals to the drive for a second severing or trimming device including a fixed knife 26 and a mobile knife 27. The knives 26, 27 are disposed downstream of the advancing rolls 22, 23 and upstream of a splicer 28 which serves to connect the trailing ends of successive films 35 with the leaders of the next-following films 35 so as to form an elongated composite film 135 which is convoluted on the core of a large takeup reel 31 prior to introduction of such reel into a developing machine, not shown. The splicer 28 is preferably a heat-sealing device which attaches to the neighboring leaders and trailing ends strips 28*a* of thermoplastic splicing material or which softens the adjacent leaders and trailing ends to an extent which is necessary to unite them in response to the application of heat and pressure by means of a suitable strip 28*a* of uniting web material. The knives 26, 27 serve to trim the leaders of films 35 so that they can be butt-spliced to each other, i.e., the leader of the next-following film 35 need not overlap the trailing end of the preceding film or vice versa.

The transporting unit including the rolls 29, 30 can be identical with the transporting unit including the rolls 22, 23, i.e., the roll 29 can be driven at a selected speed and the roll 30 can be biased toward the roll 29 by one or more springs or in any other suitable way so that the peripheral surfaces of the rolls 29, 30 can advance the films 35 (actually the composite film 135) by friction. The means for driving the roll 29 can further serve as a means for rotating the takeup reel 31 in a direction to collect the composite film 135 on its core. The takeup reel 31 is preferably provided with an opaque cylindrical envelope or shell so as to prevent exposure of convoluted composite film 135 to daylight or artificial light during transfer of a fully loaded takeup reel 31 into the developing machine.

A further output of the microprocessor 25 is connected with a display unit 32 which can include a conventional cathode ray tube.

Figure 3:
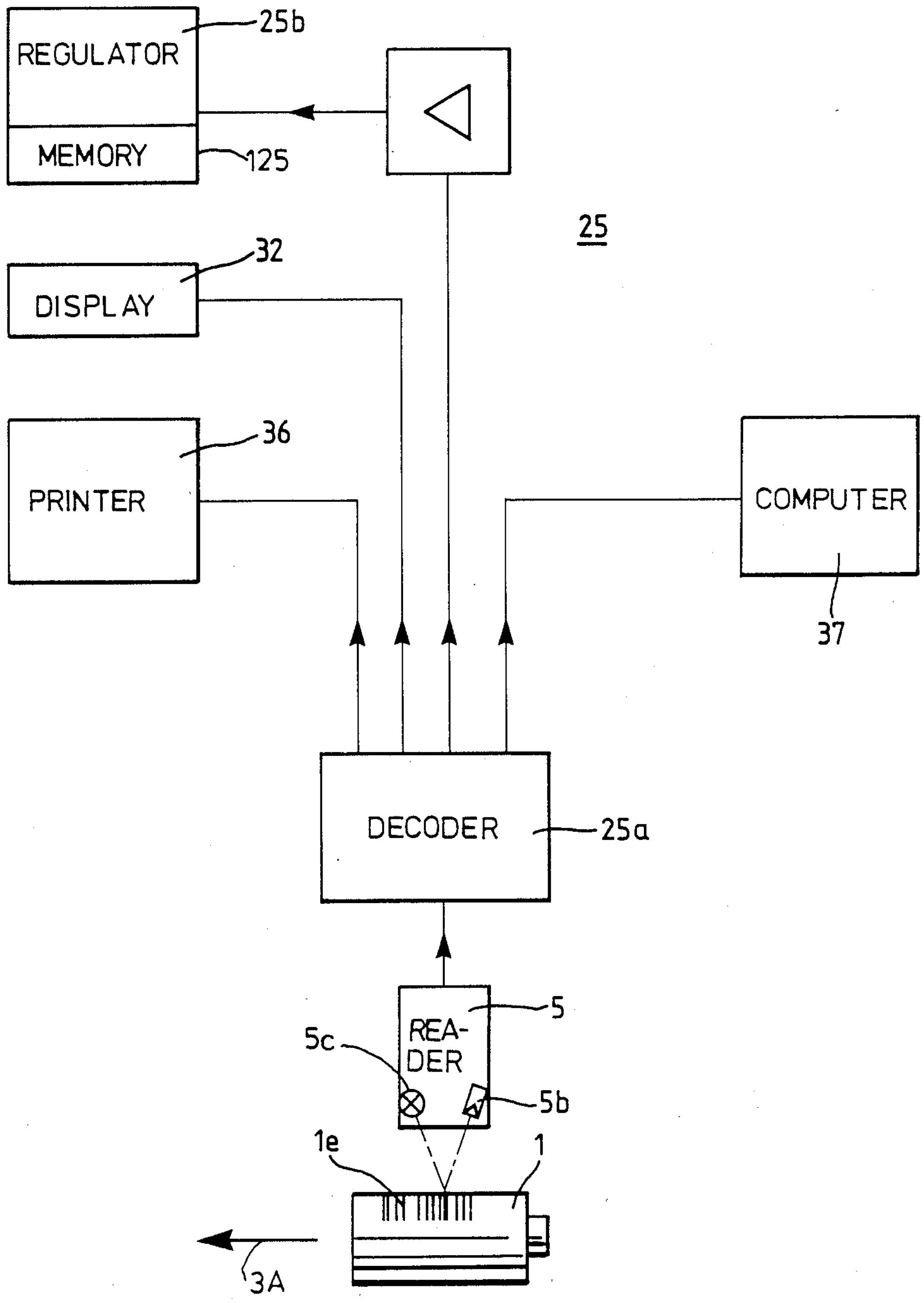
FIG. 3 illustrates certain details of the evaluating means, of the reader and of the components which receive signals from the evaluating means.

The operation of the apparatus which is shown in FIGS. 1 to 3 is as follows:

A cartridge 1 is inserted into the inlet 3*a* of the duct 3 of FIG. 1 in the direction of arrow 3A in such orientation that the projecting portion of the core 4*a* of the reel 4 in such cartridge extends upwardly and that the mouth 1*d* of the shell 1*c* is located in the lower left-hand quadrant of the duct 3. The end wall 1*b* of the cartridge 1 comes to rest on the gate 6 which then extends across the respective portion of the duct 3. The gate 6 is retracted for a short interval of time only when its prime mover receives a signal denoting that the next-following portion of the duct 3 (immediately above the orientation changing device 7) is free to receive a cartridge. The cartridge 1 then slides along the internal surface of the duct 3, and is end wall **1*b* comes to rest on the orientation changing device 7 while the shell 1*c* abuts the barrier 8. The reader 5 then transmits to the microprocessor 25 (first) signals indicative of the information which is denoted by the bar code 1*e* while the cartridge 1 slides from the level of the gate 6 toward and onto the orientation changing device 7. The bar code 1*e* contains information denoting the type of film (e.g., whether a black-and-white film, a color film or a color reversal film) as well as the number of frames on the film 35 in the cartridge 1 which advances past the slit 5*a* in the duct 3. If the film 35 which is denoted by the bar code 1*e* on a cartridge 1 advancing the slot 5*a* is not compatible with films which are to be assembled into the composite film 135, the microprocessor 25 transmits a signal, e.g., to the display unit 32) which indicates that the corresponding cartridge 1 is to be segregated from other cartridges, for example, in the region of the pivotable wall or flap 3*d* at the lower end of the duct 3. By way of example, the takeup reel 31 of FIG. 3 can be destined to collect a composite film 135 which is assembled of spliced-together regular color films 35. If the bar code 1*e* which advances past the slit 5*a* of the duct 3 denotes the presence of a cartridge 1 which contains a black-and-white film or a color reversal film, the (first) signal from the transducer 5*b* of the reader 5 to the microprocessor 25 initiates the generation of a signal (e.g., to the display unit 32) which, in turn, initiates segregation of the cartridge 1** from cartridges which contain regular color film.

The information pertaining to the number of film frames in a cartridge 1 which advances from the level of the gate 6 toward the orientation changing device 7 can be used during such early stage of processing of the cartridge to induce a printer 36 (FIG. 3) which is connected with an output of the microprocessor 25 to imprint corresponding information on a conventional envelope which is used to receive the respective exposed film 35 (normally cut up into sections each of which includes a relatively small number of frames) and the prints (if any) which are made from the respective film in a copying machine that follows the developing machine. The application of such information to envelopes by the printer 36 does not require the provision of a discrete printer since a modern film processing laboratory is normally equipped with a printer which applies to envelopes information including the customer number, the number of prints to be made from each frame of exposed film, the date of receipt of customer film and/or other data. Such printer which is already provided in the laboratory can be used to apply to the envelopes information denoting the number of film frames per film 35 which is contained in the cartridge 1 advancing past the slit **5*a* in the duct 3 of FIG. 1**.

Still further, information denoting the number of film frames in the film 35 which advances in the duct 3 past the reader 5 can be transmitted to a central computer 37 in the processing laboratory for statistical evaluation or for other purposes not germane to the present invention.

If the film 35 in the cartridge 1 which advances in the duct 3 toward the orientation changing device 7 is compatible with the films 35 forming part of the composite film 135 on the core of the takeup reel 31, the microprocessor 25 initiates retraction of the barrier 8 so that the cartridge 1 is tilted by the device 7 and by gravity to descend onto the gate 9 prior to entering the withdrawing or removing unit wherein the reel 4 and the film 35 are expelled from the respective shell **1*c* by the mechanism including the grippers 13 and the aforementioned plunger in a manner as fully disclosed in the already referenced patent to Würfel et al. as well as in U.S. Pat. No. 4,621,970 granted to Würfel et al. on Nov. 11, 1986 for "Apparatus for removing reels with exposed roll films from cartridges". The reel 4, with the film 35 convoluted around its core 4*a*, then enters the unwinding unit 34 of FIG. 2 and the film 35 is unwound from the core 4*a* in a manner as described above, i.e., first while the reel 4 is confined in the chamber of the housing including the sections 12, 15, 16 and shroud 33 and thereupon while the flanges of the reel 4 abut the ramp 18*a* of the bearing 18 adjacent the severing device including the knives 17 and 19. The friction wheel 11 rotates the reel 4 while it is still confined in the chamber of the housing in the unwinding unit 34, and the microprocessor 25 transmits a signal to open the housing by pivoting the section 16 to the position of FIG. 2 when the leader of the film 35 has advanced beyond the perforation monitoring device 20, 21 and into the nip of the advancing rolls 22, 23 so that the film 35 can be unwound from the core 4*a* of the reel 4 even if the reel is no longer rotated by the friction wheel 11. If the leader of the film 35 does not automatically enter the channel between the extensions 12*a*, 16*c* of the mobile housing sections 12 and 16, it is compelled to enter such channel by the wedge-like edge 16*b* of the section 16 while the reel 4 is still driven by the friction wheel 11. The signal which is transmitted from the microprocessor 25 to the prime mover which pivots the housing section 16 to the position of FIG. 2 need not be generated by the monitoring device 20, 21; for example, the apparatus can comprise a discrete photocell 124 which is located immediately downstream of the nip of the advancing rolls 22, 23 and generates a signal as soon as it detects the leader of a film 35 to thus ensure that the section 16 is lifted only when the film 35 which extends through the channel between the extensions 12*a*, 16*c* is already engaged by the peripheral surfaces of the advancing rolls 22 and 23. The photocell 124 which detects the leader of a film 35 downstream of the nip of advancing rolls 22, 23 is or can be identical to the monitoring device 20, 21; however, it is equally possible to employ any other suitable sensor which transmits to the microprocessor 25 a signal as soon as it detects the leader of a film 35 in the film path downstream of the advancing rolls 22, 23. As mentioned above, it is desirable to unwind the film 35 from the respective core 4*a* while the reel 4 bears against the ramp 18*a* of the bearing 18 because this even further reduces the likelihood of scratching the film 35 during unwinding, e.g., by the edge 16*b* of the pivotable housing section 16**.

If the condition of the film 35 in the path extending from the channel between the extensions **12*a*, 16*c* toward the takeup reel 31 is satisfactory, the leader of such film is trimmed by the knives 26, 27 between the advancing rolls 22, 23 and the splicer 28 so that the front edge face of the leader of the film can be caused to abut the similarly trimmed trailing end of the previously advanced film 35, i.e., of the last customer film of the composite film 135 on the core of the takeup reel 31**.

The thus trimmed leader of the film 35 is then advanced into the splicer 28 which already receives the trimmed trailing end of the preceding film 35 and butt splices the leader to the trailing end in response to the application of heat and/or pressure and by means of a portion of the strip 28*a*. The transporting unit including the advancing rolls 29, 30 is then set in motion in response to a signal from the microprocessor 25 (which receives from the splicer 28 a signal denoting completion of the splicing operation) so that the freshly spliced rearmost film 35 of the composite film 135 is convoluted onto the core of the takeup reel 31 (which is set in rotary motion jointly with the advancing roll 29). As the rolls 29, 30 advance the last film 35 of the composite film 135 in a direction to the right (as seen in FIG. 2), the last film is tensioned as soon as it is completely unwound from the core 4*a* of the reel 4 which abuts the ramp 18*a* of the bearing 18 so that only the rear end portion of the film 35 is still in contact with the core 4*a*. Such tensioning of the film 35 causes a lifting of the advancing roll 23 (or causes this roll to bear with a predetermined force against a suitable pressure gauge 123) with the result that the microprocessor 25 receives a signal which initiates the transmission of a signal to the prime mover for the mobile knife 19 which descends and cooperates with the knife 17 to sever and trim the film 35 close to the core 4*a* of the reel 4 which abuts the ramp 18*a*, i.e., behind the rearmost frame of such film. The signal which is generated by the gauge 123 in response to tensioning of the film 35 between the core 4 at the ramp 18*a* and the takeup reel 31 is further used to initiate stoppage of the advancing roll 22. Thus, the roll 23 also comes to a halt and enables the microprocessor 25 to ascertain the number of film frames which have advanced from the reel 4 at the ramp 18*a* to the takeup reel 31. Such ascertainment is made impossible because the microprocessor 25 receives signals from the photocell 24 which monitors the speed of the film 35 in the path between the unwinding unit 34 and the reel 31. The microprocessor 25 compares such information with that which is transmitted by the reader 5 and denotes the number of film frames supposed to be confined in the cartridge descending past the slot 5*a* of the duct 3, i.e., the number of film frames denoted by information forming part of the bar code 1*a* on the respective shell 1*c*. If the number of ascertained film frames (as denoted by the signals from the photocell 24 which generates signals indicating the peripheral speed of the rolls 22, 23 while the rolls 22, 23 are in motion) matches the number which is denoted by information forming part of the respective bar code 1*e*, the microprocessor 25 transmits a signal to the prime mover for the mobile knife 17 so that the film 35 is severed behind the last film frame and is properly trimmed for butt welding of its trailing end to the properly trimmed leader of the next-following film 35. The film 35 is then set in motion, so that its trimmed trailing end enters the splicer 28, and is arrested in an optimum position for splicing to the leader of the next-following film 35.

If the trailing end of a film 35 which advances along the path toward the reel 31 is not attached to the core 4*a* of the respective reel 4 (e.g., because such trailing end was forcibly separated from the core 4*a* or because the film was never properly attached to the core of the respective reel 4 and was introduced into the respective cartridge 1 without being affixed to the core 4*a*), the rearmost portion of such film is not tensioned between the reel 4 at the ramp 18*a* and the takeup reel 31 so that the advancing roll 23 is not lifted to actuate the gauge 123 and the drive means for the roll 22 is not arrested. Therefore, the trailing end of the film 35 advances beyond the monitoring device 20, 21 which transmits to the microprocessor 25 a signal denoting the absence of perforations in the path portion which is traversed by the beam or beams of radiation issuing from the source 20. In other words, absence of film 35 in the path portion between the severing device 17, 19 and the trimming device 26, 27 is reported to the microprocessor 25 in the form of information denoting defective perforations or defective webs between neighboring perforations of the film 35 downstream of the channel between the extensions 12*a* and 16*c*. The signal from the transducer 21 is then processed in the microprocessor 25 to initiate stoppage of the prime mover for the advancing roll 22, i.e., the film 35 comes to a halt. The microprocessor 25 evaluates the information from the transducer of the photocell 24 to calculate the length of the film whose trailing end was not attached to the respective core 4*a*. If the thus obtained information denotes that the number of frames on such film matches the number of film frames denoted by the corresponding portion of the bar code 1*e* on the cartridge 1, the normally required inspection of the core 4*a* of the reel 4 at the ramp 18*a* can be dispensed with because the microprocessor 25 has ascertained that the length of the film 35 is satisfactory, i.e., that no frames are left on the core 4*a* of the respective reel 4. However, if the film length which is ascertained by the microprocessor 25 on the basis of information from the photocell 24 is indicative of a number of film frames which is much less or simply less than expected (i.e., as denoted by information forming part of the bar code 1*e* on the respective shell 1*c*), the reel 4 with the remnant of film 35 on its core must be removed from the dark room for the unwinding unit 34 by hand (e.g., in a manner as disclosed in the aforementioned copending patent application Ser. No. 040,868 to Zangenfeind et al.) and the remnant of the film is exposed in a specially designed hanger-type machine. It has been found that the need for interfering with automatic operation of the apparatus is rather infrequent because the microprocessor 25 can "recognize" those films whose trailing ends might not have been affixed to the respective cores 4*a* but whose length matches that which is denoted by information in the corresponding bar code 1*e* so that an operator must interfere and withdraw a reel 4 from the unwinding unit 34 only when the microprocessor 25 ascertains that the number of film frames in the unwound portion of a film 35 is less (for example, considerably less) than that indicated by information forming part of the bar code 1*e* on the sell 1*c* of the respective cartridge 1. This reduces the number of stoppages and contributes significantly to the output of the improved apparatus.

The monitoring device 20, 21 also reports the presence of unsatisfactory perforations (or unsatisfactory webs between perforations) during unwinding of a film 35. This induces the microprocessor 25 to arrest the advancing roll 22 so that the corresponding reel 4 and film 35 can be manually removed from the apparatus and the person in charge of removing the reel is in a position to inspect the damage to the perforation. The person in charge will decide to remove the respective reel 4 from the apparatus only if the information which is supplied by the microprocessor 25 to the display unit 32 indicates that the damage to perforations is somewhere ahead of the anticipated last frame of the respective film 35. Thus, if the monitoring device 20, 21 indicates the presence of defective perforations while the microprocessor 25 indicates that the anticipated number of film frames (as denoted by the information forming part of the respective bar code 1e) has already advanced beyond the monitoring device 20, 21, the person in charge will decide against removal of the corresponding reel 4 because the information which is displayed in response to a signal from the monitoring device 20, 21 denotes that this device has generated a signal as a result of advancement of a trailing end which was not attached or was not properly attached to the respective core 4a. Still further, the person in charge can decide against removal of the respective reel 4 from the unwinding unit 34 if the monitoring device 20, 21 generates a signal denoting the presence of defective perforations or defective webs between perforations in a film portion which is located behind the rearmost film frame, i.e., behind the rearmost anticipated film frame as denoted by the information forming part of the respective bar code 1e. The person in charge will decide to remove a reel 4 only when the information which is displayed by the unit 32 and is furnished by the microprocessor 25 indicates that the reel 4 which abuts the ramp 18a is likely or certain to still carry a film portion which includes one or more frames that must be exposed in order to satisfy the customer. If the damage to perforations is behind the last film frame, the operator can decide to cause the knives 17, 19 to sever the corresponding portion of the film 35 from the preceding portion (which includes the film frames) and to have the remnant of film (with defective perforations) expelled from the unwinding unit 34 in a fully automatic way, the same as the reels 4 which carry only the rearmost portions of trailing ends of the respective films 35. Thus, actuation of the severing device 17, 19 can be initiated by the person in charge in order to avoid manual removal of the corresponding reel 4 from the unwinding unit 34.

FIG. 3 shows the manner in which signals are transmitted from the reader 5 to the microprocessor 25 and from the microprocessor to the central computer 37 of the processing laboratory, to the aforementioned printer 36, to the aforementioned display unit 32 and to a regulator or comparator 25b by way of an amplifier 125. The regulator 25b is actually an element of the microprocessor 25, and this microprocessor further comprises the decoder 25a which receives signals from the transducer 5b of the reader 5 of bar codes 1e on the shells 1c of successive cartridges 1 in the duct 3. The radiation source 5c of the reader 5 can include one or more light emitting diodes each of which includes a source of infrared light and causes the photoelectronic transducer 5b to transmit signals to the decoder 25a when the beam or beams of infrared light from the diode or diodes are reflected by the information constituting a bar code 1e. The optical system which is located in the path of propagation of the beam between the bar code 1e and the transducer 5b is not shown in the drawing. The reader 5 preferably further comprises an amplifier which amplifies the signals from the transducer 5b, and an analog-digital converter which digitalizes the amplified signals prior to transmission of such signals to the decoder 25a of the microprocessor 25.

The decoder 25a of the microprocessor 25 has an output which transmits to the printer 36 signals denoting the length of film 35 in the cartridge 1 whose bar code 1e is monitored by the reader 5. As explained above, the printer 36 is used to apply information which is denoted by a portion of the respective bar code 1e (namely the information denoting the length of the film in the respective cartridge 1) to the envelope which is to receive the developed film and, if ordered by the customer, one or more sets of prints which are made from the exposed and developed film frames. The thus applied information on the envelope then serves as evidence that the corresponding customer film 35 has entered the duct 3 of the improved apparatus and its cartridge 1 has been inspected by the reader 5. The number of films which are shorter than indicted by the respective bar code 1e is small or negligible so that it can be readily assumed that the number of frames in a film in the cartridge 1 which advances past the reader 5 matches the number of frames which are denoted by the corresponding portion of the respective bar code 1e. The information which is indicative of the number of film frames (i.e., of the length of the film) and has been applied to the corresponding envelope can be used for proper calculation of the cost of the processing a particular film for the purpose of billing the customer.

An advantage of the just described processing of signals denoting the number of film frames on films which advance in the duct 3 is that it is not necessary to arrest the films 35 in the path between the unwinding unit 34 and the takeup reel 31 for the express purpose of ascertaining the number of frames per film 35, i.e., the processing of films takes up much less time than in conventional processing apparatus wherein a determination of the number of film frames (i.e., of the length of successive films) takes place subsequent to removal of films from the respective cartridges and subsequent to unwinding of films from the respective reels. Moreover, the printer 36 can be put to use during intervals when the printers of conventional processing apparatus are idle. Apparatus for introducing developed films and prints into envelopes for shipment from processing laboratories to customers and for applying information to envelopes are disclosed in numerous United States and foreign patents of the assignee of the present application.

The microprocessor 25 causes the unit 32 to display the information which is obtained in response to monitoring of a bar code 1e by the reader 5, i.e., the unit 32 displays information which is indicative of the length and type of films 35 in successive cartridges 1 which advance from the inlet 3a toward the outlet of the duct 3. Still further, the microprocessor 25 transmits information which is obtained from the reader 5 to the central computer 37 of the processing laboratory, preferably by way of an interface. As explained above, the central computer 37 stores the thus obtained information for statistical and/or other purposes. The information which is transmitted to the central computer 37 may be of interest in order to determine the number of films 35 which are processed per unit of time (e.g., per hour or per day), the number of certain film types (such as color film) which are processed in the apparatus per unit of time, the makers of films which are processed in the apparatus (certain information in the bar codes 1e can be indicative of the makers of the respective films 35). Moreover, such information can include data denoting the sensitivity (speed) of the respective films. The central computer 37 can further process information denoting the number of short, medium long or long films (e.g., films with twelve, twenty, twentyfour or thirtysix frames). This enables the owner or owners of the processing laboratory to undertake necessary measures as concerns investment for additional or different equipment, advertising expenses and others.

Of course, the information which denotes the length of films 35 is further used to induce the microprocessor 25 to generate signals in a manner as described above in connection with FIG. 2, i.e., to arrest the advancing roll 22 when the number of film frames calculated on the basis of information from the monitoring device 20, 21 deviates from information forming part of the respective bar code 1*e*.

An important advantage of the improved method and apparatus is that the films 35 are monitored for compatibility in a very simple but highly reliable way and without the need for prolonging the processing of discrete films for the express purpose of ascertaining whether or not a film which is to be processed is compatible with films which form part of the composite film 135, i.e., of the film which is destined for transfer into a developing machine for films of a certain type. This is due to the fact that the information denoting the types of films is obtained from the reader 5 which is adjacent the path of movement of cartridges 1 in the duct 3 and the cartridges need not be arrested or slowed down for the express purpose of permitting a reading of the information which is stored in the form of bar codes 1*e* (bar codes are but one of many different types of information which can be sorted on the cartridges 1 to denote the types and lengths of the films therein). As a rule, a processing laboratory will receive three types of films, namely negative black-and-white films, negative color films and color reversal films. Each of these film types requires at least one different chemical treatment in the developing machine so that it is important to segregate all black-and-white films and all color reversal films if the apparatus is to form a composite film 135 consisting of a series of successive regular color films. Analogously, the apparatus must segregate all regular color films and all color reversal films if the takeup reel 31 is to store a composite film consisting of a series of black-and-white films. The same holds true if the apparatus is to form a composite film consisting of color reversal films, i.e., it is then necessary to segregate all color films and all black-and-white films. In the absence of careful classification, a black-and-white film would be damaged beyond salvaging if it were processed simultaneously with color films and vice versa.

The microprocessor 25 contains at least one memory 125 for signals denoting information pertaining to all films which are identified by the well-known DX-code and denoting black-and-white films, color reversal films and color films. The memory 125 can form part of the regulator 25*b* which receives digital signals from the decoder 25*a* via amplifier 125. The regulator 25*b* compares the (first) signals from the reader 5 with second signals (in 125) denoting that type of film which is to be convoluted on the core of the takeup reel 31 and, if the result of such comparison is satisfactory, the regulator 25 does not interfere with automatic withdrawal or removal of reels 4 from the respective shells 1*c*, automatic unwinding of films 35 from the respective reels 4, and automatic splicing of the leaders of successive films to the trailing end of the composite film 135.

If the regulator 25*b* determines that the film in the cartridge 1 advancing past the reader 5 is not compatible with the films 35 forming part of the composite film 135, the regulator compares the (first) signal from the reader 5 with third signals (memory 125) denoting the other two types of films (e.g., black-and-white films and color reversal films if the takeup reel 31 is to collect a composite film 135 consisting of a series of regular color films) and arrests the apparatus so as to enable the person in charge to remove the cartridge 1 with noncompatible film therein before the film is withdrawn from the respective cartridge and is unwound from the respective reel 4. The person in charge is informed as a result of non-anticipated stoppage of the machine as well as because the information denoting detection of a cartridge containing noncompatible film is displayed by the unit 32.

If the cartridge 1 which advances past the reader 5 does not bear any information or contains or carries information denoting a film of a type other than one of the aforeenumerated customary film types, the microprocessor 25 transmits information to the display unit 32 and the person in charge can decide to withdraw the respective cartridge from the apparatus if the information which is displayed by the unit 32 indicates that the respective film cannot be processed with the films forming part of the composite film 135, or such person can decide to permit the film to be processed in the customary way if the information which is displayed at 32 indicates to the person in charge that, though not belonging to the class of films which form the composite film 135, the film in the cartridge bearing information not denoting a color film, a color reversal film or a black-and-white film can be processed in the developing machine together with films forming the composite film 135. In other words, an experienced operator then uses her or his judgment in order to decide to remove the respective cartridge by hand or to permit such cartridge to undergo a treatment in the same way as cartridges containing films which are being spliced together to form the composite film 135. If the number of cartridges containing films which are compatible but not identical with selected films is relatively large, the memory 125 of the regulator 25*b* is altered so that the regulator no longer arrests the machine when the cartridges containing films of such character advance past the reader 5. If the number of films which are not compatible with any of the three standard film types is substantial, the memory 125 of the regulator 25*b* is adjusted to store further third signals which re indicative of such types of films so that the person in charge of observing the display unit 32 will be informed that a film of the fourth type is contained in the cartridge 1 whose monitoring at 5 has resulted in stoppage of the apparatus.

If a cartridge 1 in the duct 3 does not carry any information (this is the case with certain older types of films and with films which are furnished by certain makers who do not apply the DX-code), the person in charge removes the respective cartridge prior to automatic removal of the film therefrom and inspects the cartridge for information which would permit a determination as to the length and/or type of film therein (e.g., by noting the name of the manufacturer and/or the country of origin). If the person in charge ascertains that the non-identified cartridge (or a cartridge containing information other than that stored in the memory 125 of the regulator 25*b*) contains a film which is compatible with the selected films (i.e., with those which are to form the composite film 135), the cartridge is reintroduced into the duct 3 or into the unit 34 and the apparatus is caused to proceed with the treatment of the respective film in the same way as in connection with films which were withdrawn from cartridges bearing proper data as to the type and length.

A customer film is likely to be delivered to the processing laboratory with perforations which are defective in the region between the last film frame and the core of the reel if the user of the camera in which the film was exposed has attempted to advance the film subsequent to exposure of the last film frame. As explained above, such damage to perforations need not entail a stoppage of the apparatus because the microprocessor 25 enables the person in charge to ascertain that the perforations are damaged behind the last film frame.

The manner in which a composite film is treated in a copying machine is disclosed in commonly owned U.S. Pat. No. 4,565,442 granted to Benker et al. on Jan. 21, 1986 for "Method of and apparatus for copying photographic originals". This patent further shows splices between successive compatible films and perforations in marginal portions of the films. Exposed and developed problem films can be copied in a machine of the type disclosed in commonly owned U.S. Pat. No. 4,704,026 granted Nov. 3, 1987 to Rauh et al. for "Copying method and arrangement for difficult-to-copy originals".

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of processing a series of successive exposed photographic films which are identified by machinereadable information denoting at least the type of film, comprising reading the information for successive films of the series and generating first signals denoting the thus obtained information; a first step of comparing successive first signals with a second signal denoting films of a first type; a second step of comparing at least one third signal denoting films of at least one second type with first signals which are incompatible with said second signal; advancing along a predetermined path the films denoted by first signals which are compatible with said second signal; segregating the films denoted by first signals which are compatible with the third signal; and individually inspecting and classifying the films denoted by first signals which are incompatible with the second and third signals.

2. The method of claim 1 of processing a series of successive exposed photographic films which are identified by machine-readable information denoting the type of film in random distribution with additional exposed photographic films without machine-readable information, further comprising subjecting the additional films to inspection by an attendant, and admitting into said path those attendant-inspected additional films which are categorizable with films advancing along said path.

3. The method of claim 1 of processing a series of successive exposed photographic films which are identified by machine-readable information denoting the type and length of film, wherein said reading step includes generating first signals denoting the ascertained information pertaining to the types and lengths of successive films, and further comprising recording information denoting the length of films which are advanced along said path on envelopes for future storage of the respective films therein.

4. The method of claim 1 of processing a series of successive exposed photographic films which are identified by machine-readable information denoting the type and length of each film, wherein said reading step includes generating first signals denoting information pertaining to the types and lengths of successive films, said first comparing step including comparing each first signal with at least one fourth signal denoting the actual length of the respective film and said inspecting step including individually inspecting and classifying films having a length which deviates from the length denoted by the respective information.

5. The method of claim 1 of processing a series of successive exposed films which are convoluted on reels in cartridges bearing machine-readable information denoting at least the type of film, further comprising the step of removing the reels with films from the respective cartridges prior to said first comparing step and subsequent to said reading step.

6. The method of claim 1, further comprising the step of splicing successive films in said path to each other end-to-end.

7. The method of claim 1, wherein said comparing steps are carried out in a microprocessor having at least one memory for the second signal and the at least one third signal.

8. The method of claim 1, further comprising the step of displaying first signals which are incompatible with at least one of the second and third signals.

9. Apparatus for processing a series of successive exposed photographic films which are identified by machine-readable information denoting at least the type of film, comprising means for reading information for successive films of the series and for generating first signals denoting the thus ascertained information; signal evaluating means including a source of second signals denoting films of a first type and of at least one third signal denoting films of at least one second type, means for comparing successive first signals with said second signals for compatibility and for comparing the third signal with first signals which are incompatible with the second signal; means for advancing films along a predetermined path, said evaluating means including means for effecting the admission into said path of successive films denoted by first signals which are compatible with the second signals; and facilities for individual inspection and classification of films denoted by first signals which are incompatible with the second and third signals.

10. The apparatus of claim 9 for processing a series of successive exposed photographic films which are convoluted on reels in cartridges with machine-readable information applied to the exterior of the respective cartridges, further comprising means for removing reels with films from the respective cartridges subsequent to reading of information by said reading means and prior to admission of films into said path.

11. The apparatus of claim 10, further comprising a downwardly sloping duct having an upper end portion provided with an inlet for cartridges containing successive reels of films of said series and being arranged to deliver the cartridges to said reel removing means in a predetermined orientation, and means for unwinding successive films from the respective reels prior to admission of films into said path, said reading means being adjacent said duct.

12. The apparatus of claim 11 for processing a series of successive reels of films in cartridges with machine-readable information denoting the type and the length of film, wherein said reader includes means for transmitting to said evaluating means first signals which are indicative of the types and lengths of the respective films, and further comprising means for measuring the length of unwound films and for transmitting to said evaluating means fourth signals denoting the measured length, said evaluating means further comprising means for comparing said fourth signals with the corresponding first signals and for generating fifth signals when the film length which is denoted by a fourth signal deviates from the film length denoted by the corresponding first signal.

13. The apparatus of claim 12, further comprising severing means operable to separate the trailing ends of films from the respective reels, said evaluating means comprising means for preventing the operation of said severing means in response to the generation of said fifth signals.

14. The apparatus of claim 12, further comprising means for monitoring said path for the presence of trailing ends of successive films therein and for transmitting to said evaluating means additional signals in response to detection of trailing ends, said evaluating means including means for initiating the comparison of the respective fourth signals with the corresponding first signals in response to reception of said additional signals.

15. The apparatus of claim 12 for processing a series of successive exposed photographic films having marginal perforations, further comprising means for monitoring the condition of perforations of films in said path and for generating additional signals denoting the condition of monitored perforations, and severing means operable to separate the trailing ends of films from the respective reels in response to additional signals denoting satisfactory condition of perforations on the respective films.

16. The apparatus of claim 12 for processing a series of successive exposed photographic films having marginal perforations, further comprising means for monitoring the condition of perforations of films in said path and for generating additional signals denoting the condition of monitored perforations, said removing means including means for expelling empty reels from said unwinding means in response to additional signals denoting satisfactory condition of perforations on the respective films.

17. The apparatus of claim 12, further comprising means for displaying said first and fourth signals.

18. The apparatus of claim 12, further comprising means for monitoring said path for the presence of ends of successive films therein and for transmitting additional signals in response to detection of film ends, and means for displaying said additional signals.

19. The apparatus of claim 12 for processing a series of successive exposed photographic films having perforations, further comprising means for monitoring the condition of perforations of films in said path and for transmitting additional signals denoting the condition of monitored perforations, and means for displaying said additional signals.

20. The apparatus of claim 12, wherein said unwinding means includes means for expelling empty cartridges, said evaluating means comprising means for preventing the operation of said expelling means in response to the generation of said fifth signals.

21. The apparatus of claim 12, further comprising means for displaying said fifth signals.

22. The apparatus of claim 12, wherein said evaluating means comprises means for deactivating at least one of said unwinding, removing and advancing means in response to the generation of said fifth signals.

23. The apparatus of claim 12, wherein said evaluating means comprises means for arresting said advancing means in response to the generation of said fifth signals.

24. The apparatus of claim 12, wherein said evaluating means comprises means for arresting the leaders of the films in a predetermined portion of said path in response to the generation of said fifth signals.

25. The apparatus of claim 10, further comprising means for monitoring said path for the presence of trailing ends of successive films therein and for transmitting to said evaluating means additional signals in response to detection of trailing ends.

26. The apparatus of claim 10 for processing a series of successive exposed photographic films having marginal perforations, further comprising means for monitoring the condition of perforations of films in said path and for transmitting to said evaluating means additional signals denoting the condition of monitored perforations.

* * * * *